UNITED STATES PATENT OFFICE.

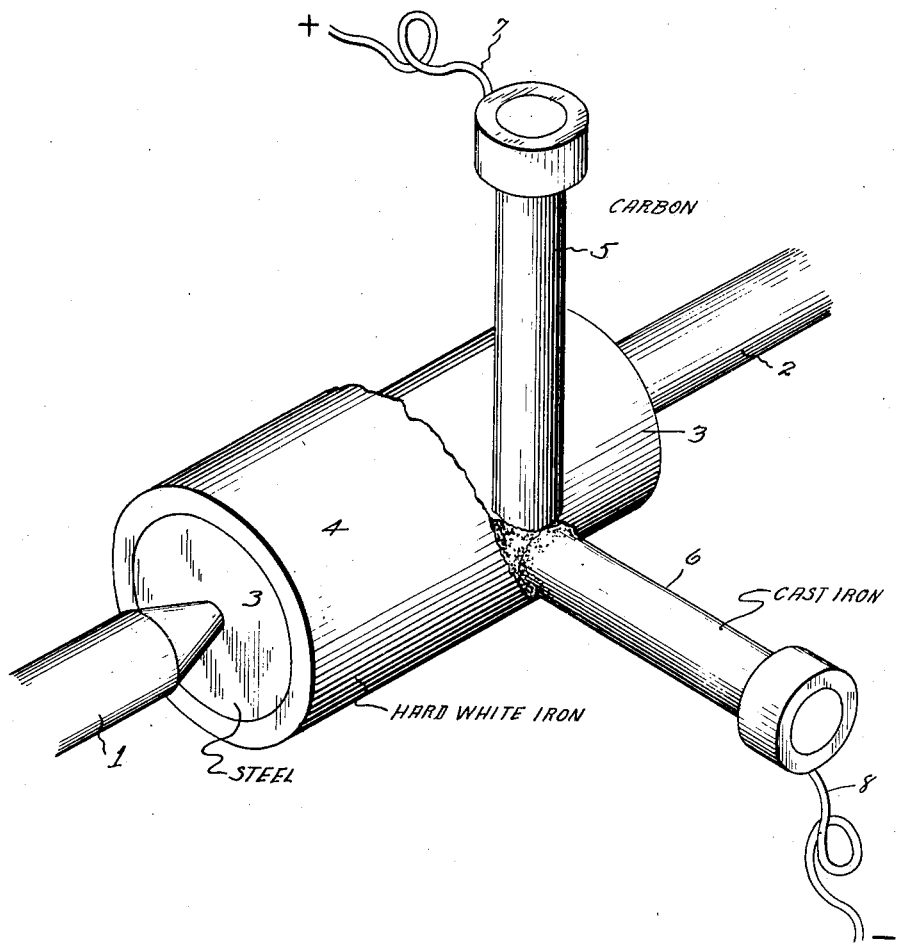

JEAN FRANÇOIS REGIS ROUSSEAU, OF INDIANAPOLIS, INDIANA.

PROCESS OF MAKING COMPOSITE METAL ARTICLES.

1,416,879. Specification of Letters Patent. Patented May 23, 1922.

Application filed April 15, 1920. Serial No. 374,176.

*To all whom it may concern:*

Be it known that I, JEAN FRANÇOIS REGIS ROUSSEAU, a subject of the King of Great Britain, residing at Indianapolis, in the county of Marion and State of Indiana, have invented a certain new and useful Improvement in Processes of Making Composite Metal Articles, of which the following is a full, clear, and exact description, reference being had to the accompanying drawings.

This invention relates to a process of producing composite metal articles, and especially articles having a hard operating surface and a relatively strong supporting body for such surface. My process is especially well adapted for the production of bearings, cam shafts, and machine tools, although not limited to the production of such articles.

A bearing made in accordance with my process will consist of a main or supporting body of steel, while the actual bearing surface will be hard white iron, welded to the steel. In producing the bearing, I preferably employ ordinary cast iron as one of the electrodes of an electric welding apparatus; or I may also produce the same by applying the cast iron to the steel by melting the former by means of the carbon electrode of such a welding apparatus. After, and by virtue of, the welding operation, the cast iron can be quickly chilled, converting it into hard white iron having a very hard and glassy bearing surface.

In the production of cam shafts, the shaft and the base portion of each cam will be made from an ordinary drop forging. Each cam will then be built up somewhat oversize by welding cast iron thereto in the manner described in connection with the production of a bearing. The welding operation and the subsequent chilling will convert the cast iron into hard, white iron, after which the cams may be ground to size. Cams made in this manner will last for a very long period of time without any appreciable wear.

The cutting portions of machine tools may be formed in the same manner as the cams for cam shafts.

The electric welding apparatus is peculiarly adapted for the realization of my process because of the fact that only a small section of the two metals is subjected at the same time to the heating action. This localizes the heat due to the welding and enables the iron to be chilled quickly, thereby ensuring its conversion into the hard white iron desired.

In the drawing, which is a diagrammatic perspective view of one mode for realizing my invention, 1 and 2 denote a pair of revoluble centers supporting between them a steel core 3. 4 denotes a bearing surface which has been built up and is being further built up upon such core by means of an electric welding apparatus comprising a graphite or carbon electrode 5 and a cast iron electrode 6, the conductors for said electrodes being indicated at 7 and 8 respectively. As the core or main supporting body 3 is revolved the electrodes 5 and 6 are advanced longitudinally of the core, the cast iron of the electrode 6 being fused and deposited upon the core or body 3 to form the bearing surface 4.

Having thus described my invention, what I claim is:—

1. The process of producing a composite metal article which comprises welding ordinary cast iron to a suitable base of steel, localizing the heat of such welding to a relatively small section of the metals, and chilling the iron thereby to convert it into hard white iron.

2. The process of producing a composite metal article which comprises welding ordinary cast iron to a steel base by means of electricity, thereby localizing the heating of the metals during such welding operation, and chilling the iron quickly to ensure its conversion into hard white iron.

3. The process of producing a composite metal article having a steel base and a hard white iron member which comprises welding ordinary cast iron to the steel base through means of an electrical welding apparatus in which the iron member is employed as an electrode, thereby localizing the heat, and permitting the said member to chill quickly in order to produce hard white iron.

4. The process of producing a built up metal article having a steel base which comprises quickly welding a suitable cast iron member to said base, localizing the application of heat during the welding operation, and quickly chilling the iron member whereby the latter will be converted into hard white iron.

In testimony whereof, I hereunto affix my signature.

JEAN FRANÇOIS REGIS ROUSSEAU.